United States Patent Office 2,779,497
Patented Jan. 29, 1957

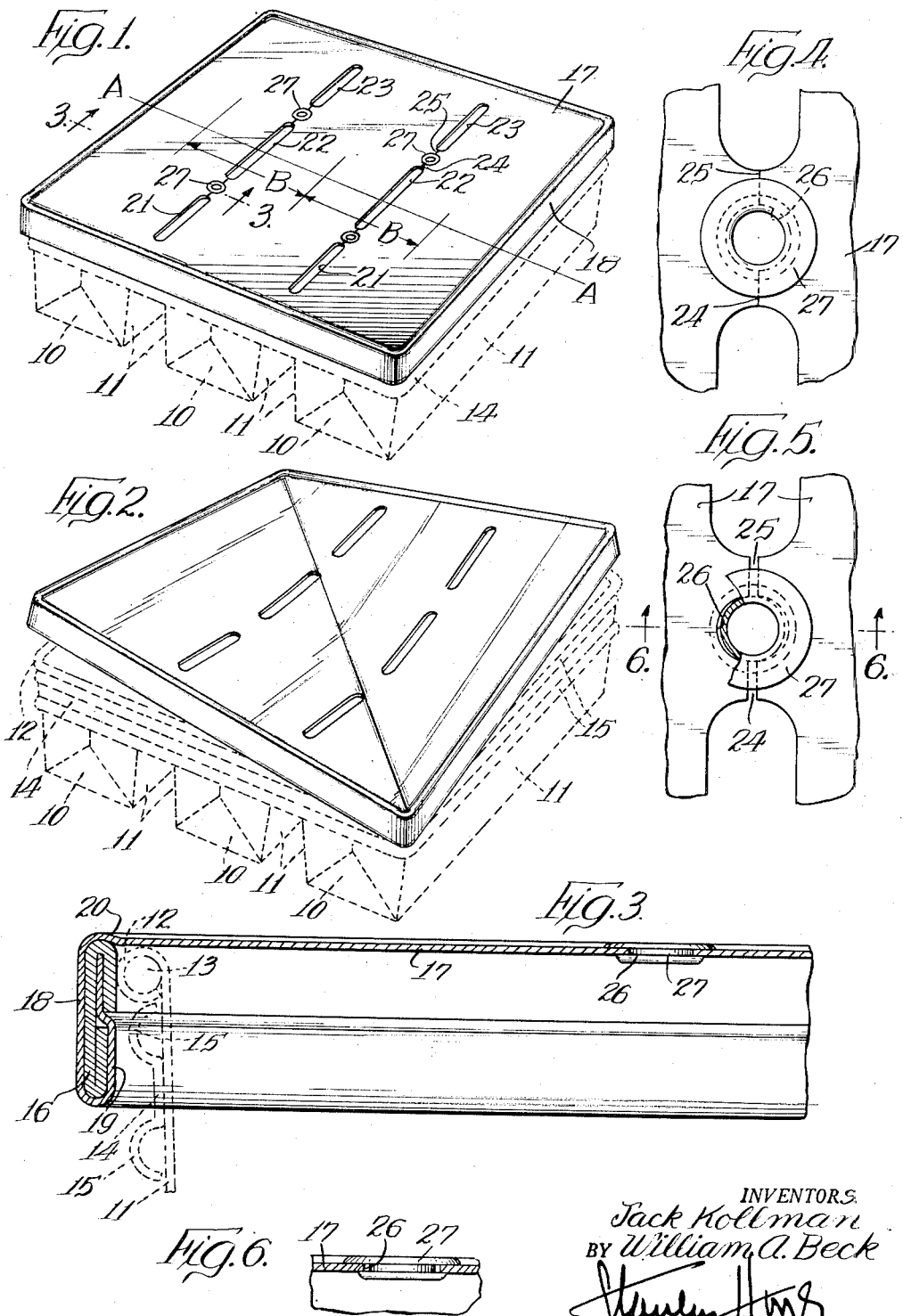

2,779,497

BAKE PAN COVERS

Jack Kollman, Chicago, and William A. Beck, Itasca, Ill., assignors to Ekco Products Company, Chicago, Ill., a corporation of Illinois Application July 1, 1953, Serial No. 365,396

2 Claims. (Cl. 220—23.2)

This invention relates to reinforced covers, and more particularly covers of the type used in conjunction with bake pan sets wherein the upward expansion of the contents of pans are controlled while undergoing baking and preparation for baking by means of a cover applied to the upper edges of the pans.

Covers of this type usually include a relatively rigid rectangular marginal reinforcing frame member adapted to embrace the outer top edge portions of the pans of the set while the body of the cover spanning the area defined by said outer top edge portions of the pans was provided with marginal flanges secured to the frame member.

There is a tendency for such covers to warp due to strains developed in the body of the cover under severe temperature changes.

It is accordingly an object of this invention to provide improvements in covers of this type by which such strains may be absorbed without warpage of the cover.

With the above and other objects in view, as will be apparent, this invention consists in the construction, combination and arrangement of parts, all as hereinafter more fully described, claimed and illustrated in the accompanying drawings, wherein:

Fig. 1 is a top perspective view of a cover embodying the features of this invention, showing a bake pan unit, in dotted lines, as the same would appear when the cover is in operative relation to said bake pan unit.

Fig. 2 is a similar view showing the distortion which occurs in a cover of former design, due to lack of stress-relieving means as contemplated by the present invention.

Fig. 3 is an enlarged fragmentary section taken on line 3—3 of Fig. 1.

Fig. 4 is an enlarged fragmentary portion of the cover showing relative position of opposed edge portions of a stress-relieving opening in the body of the cover when the cover is in normally unstressed condition.

Fig. 5 is a similar view showing the same edge portions in relatively moved apart state when the cover is in a stressed condition.

Fig. 6 is a section taken on line 6—6 of Fig. 5.

In the drawings, a dotted line portion designates a multiple pan set which is intended to be typical and illustrative of bake pan sets generally and to which the present cover is particularly applicable. Each of the pans of the set includes opposed upright end walls 10 and upright side walls 11. A flange 12 extending from the upper edge of said walls 10 and 11 is wrapped about a reinforcing wire to form an outstanding bead about the mouth of each pan. A strapping member 14, having longitudinally beaded edge portions 15 provides a frame to which the end walls 10 of the pans are secured in fixed spaced apart relation.

The cover construction and assembly contemplated by the present invention includes a marginal frame member 16 consisting of a strip of metal bent into a shape adapted to conform with and loosely embrace the rectangular shaped area defined by the upper edge of the strapping member 14 surrounding the pans of the set. A separate top member 17 consisting of a single sheet of metal is provided with marginal portions 18 which are folded about the frame member 16 so as to position the free edge 19 of said marginal portions 18 interiorly of the frame member 16. The body of the top member 17 located within said marginal portions 18 is preferably arranged in a plan offset downwardly with respect to the marginal portion 18 where the latter initially joins the frame member 17 so as to create a bevelled shoulder 20 about the periphery of said body position of the top member 17.

The cover is provided with a series of vent openings 21, 22 and 23 in alignment with the zone or space dividing adjacent pans for the purpose of assuring satisfactory circulation of heated air between the pans.

The portion of the cover body forming a bridge between each vent opening and the next opening in alignment therewith lengthwise of the dividing zone between adjacent pans, is slit or fractured as at 24 and 25. A relatively enlarged opening 26 is located centrally of the length of each slit. Thus the vents 21, 22 and 23, in conjunction with the slits 24 and 25 and the openings 26, define a continuous fracture of the cover body in such relation to the boundaries of the cover as to be intersected by a line A—A (see Fig. 1) bisecting each pair of adjacent pans at right angles to the dividing zone between said pans, and of a length at least equal to the distance between the center median lines B—B (see Fig. 1) of said pair of adjacent pans measured along said line A—A.

Each of the openings 26 contains a metal grommet 27 presenting axially opposed annular flanges engageable with the margins of the openings 26 to effectively control deflection of said margins out of the plane of the cover and yet have such clearance between the grommet and the margins of the openings 26 as to allow for relative movement of the cover sections cross-wise of the cover between a spread apart position as in Fig. 5 and a close together position as in Fig. 4 in response to stress applied to the cover under widely varying temperature conditions.

As a consequence, distortion and warpage of the cover such as indicated in Fig. 2, is overcome in the cover contemplated by this invention, by the use of continuous fracture as heretofore detailed, in that such fracture enables the cover sections at opposite sides of the position overlying the dividing zone between adjacent pans, to have the necessary freedom of relative movement within controlled planes as defined by the cover engaging flanges of the grommets 27.

What is claimed is:

1. A cover for a baking pan set consisting of a plurality of baking pans in fixed, assembled relation and spaced apart by a dividing zone, said cover comprising a marginal frame member and a separate top member consisting of a single sheet of metal having its marginal portions secured to said frame member, vent openings in said top member arranged in spaced apart relationship lengthwise of and in alinement with each dividing zone of the bake pan assembly, and means connecting said vent openings to thereby define a continuous fracture of the top member wherein the length of the fracture is such as to be intersected by a line bisecting each pair of adjacent pans at right angles to the dividing zone between pans, and said length is at least equal to the center to center distance between said pair of adjacent pans measured along said intersecting line, said means including a relatively narrow slit forming an extension of one of said vent openings and a second slit forming an extension of a second of said vent openings and connected to said first narrow slit.

2. A cover for a baking pan set in accordance with claim 1 wherein a grommet positioned at the juncture of said slits is operative to maintain opposite edge portions of said slits in substantially coplanar alinement transversely of the cover.

References Cited in the file of this patent

UNITED STATES PATENTS

| | | |
|---|---|---|
| 2,257,468 | Langel | Sept. 30, 1941 |
| 2,601,099 | Darnell | June 17, 1952 |